United States Patent [19]

Meckler

[11] 4,165,036
[45] Aug. 21, 1979

[54] MULTI SOURCE HEAT PUMP AIR CONDITIONING SYSTEM

[76] Inventor: Milton Meckler, 16348 Tupper St., Sepulveda, Calif. 91343

[21] Appl. No.: 828,773

[22] Filed: Aug. 29, 1977

[51] Int. Cl.² .......................................... G05D 23/00
[52] U.S. Cl. .................................. 237/1 A; 237/2 B; 62/238
[58] Field of Search ................... 62/2, 260; 126/400; 237/1 A, 2 B

[56] References Cited

U.S. PATENT DOCUMENTS

| | | | |
|---|---|---|---|
| 2,529,154 | 11/1950 | Hammond et al. | 62/2 X |
| 2,749,724 | 6/1956 | Borgerd et al. | 62/260 |
| 2,860,493 | 11/1958 | Capps et al. | 62/260 X |
| 3,247,679 | 4/1966 | Meckler | 62/271 |
| 3,957,109 | 5/1976 | Worthington | 165/485 |
| 3,965,972 | 6/1976 | Peterson | 237/1 A X |
| 3,996,759 | 12/1976 | Meckler | 165/62 |
| 4,012,920 | 3/1977 | Kirschbaum | 237/2 B X |
| 4,030,312 | 6/1977 | Wallin et al. | 62/2 |
| 4,037,650 | 7/1977 | Randall | 237/2 B X |
| 4,064,867 | 12/1977 | Schlesinger | 165/137 X |

OTHER PUBLICATIONS

"Solar Heating with Heat Pump Auxiliary", *PPG Catalog*, Feb. 7, 1976.

*Primary Examiner*—Lawrence J. Staab
*Attorney, Agent, or Firm*—William H. Maxwell

[57] ABSTRACT

An air conditioning system utilizing low temperature heating sources of the environment, so as to maximize the heat coefficient of performance ($COP_H$) by conserving subterranean heat, atmospheric heat, solar heat and auxiliary heat sources in combination with a reversible-cycle water source heat pump, by absorption of heat energy into a liquid (water) and by applying said heat energy to the heat pump evaporator during the Heating Mode of operation to be absorbed by the refrigerant at low temperature, later to be rejected by the heat pump condensor at a higher temperature, thereby increasing the coefficient of performance, the capacity requirement of the heat pump unit being reduced by utilizing heat energy storage (hot and chilled), and by recirculating air therethrough for the accumulation and storage of supplemental heated and chilled water as required; and, discharging any excess heat through louvered solar panels opened for heat exchange and closed for heat absorption.

20 Claims, 9 Drawing Figures

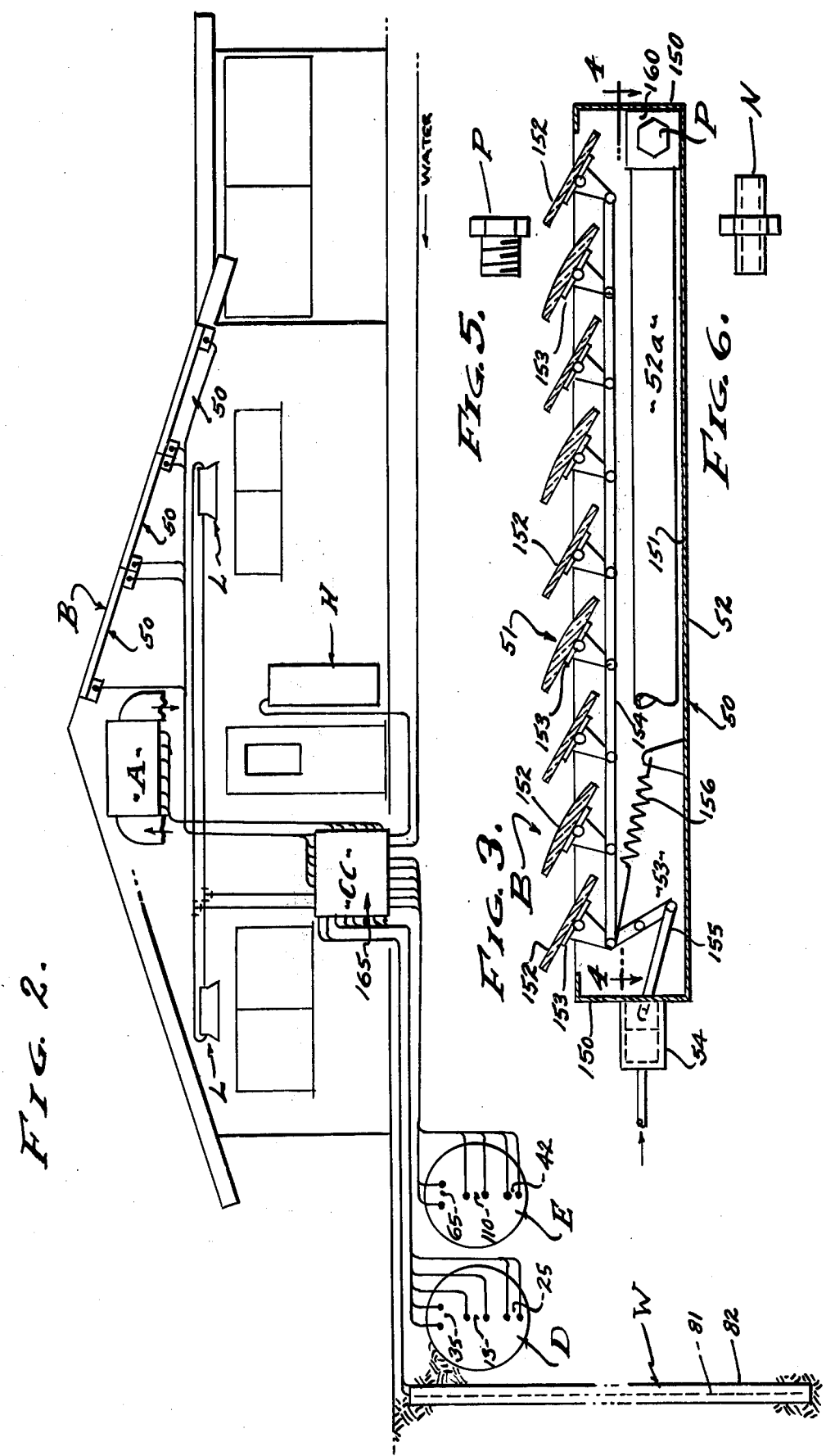

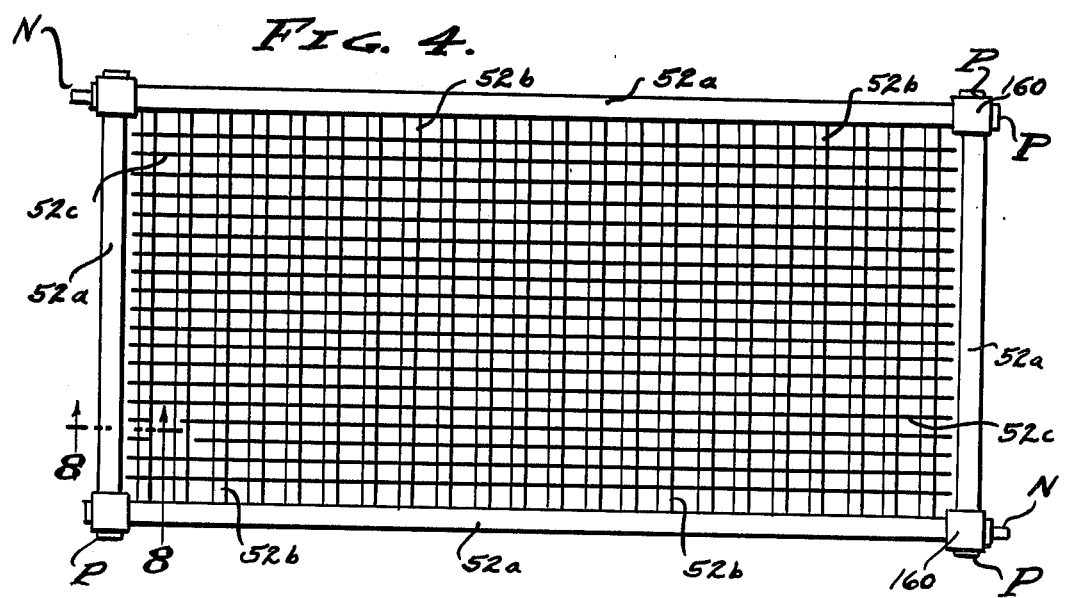
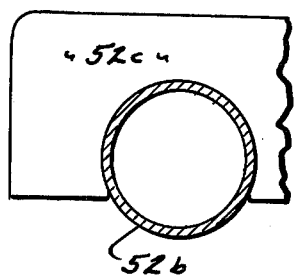
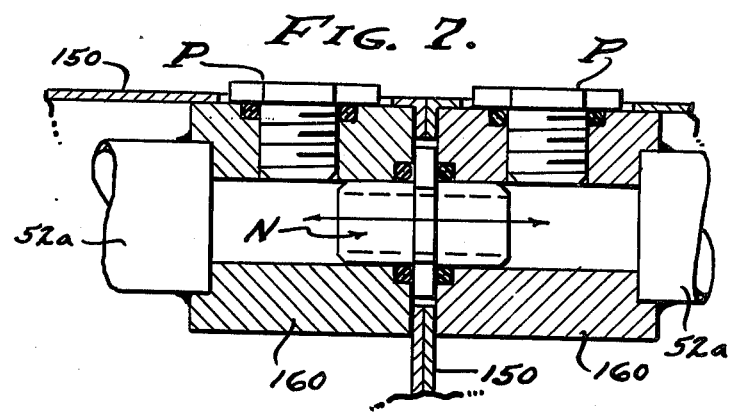
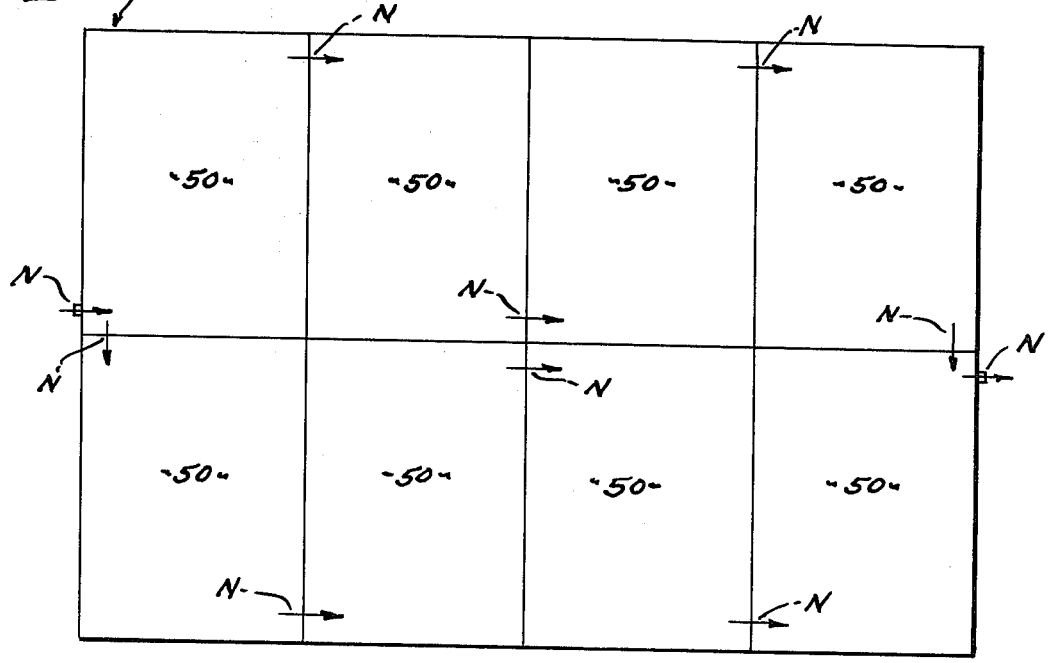

MULTI SOURCE HEAT PUMP AIR CONDITIONING SYSTEM

BACKGROUND

Air conditioning systems require energy for raising and lowering air temperature and which can be assisted by the storage of "solar insolation" heated liquid and/or conversely by the storage of chilled liquid, and also assisted by absorption from or into the surrounding ambient air. The collection of solar heat energy is normally within a range of nominally 100° to 180° F. or higher, while the heat pump can be assisted from a water source within a range of 55° to 90° F.; and to these ends I have provided a stratified thermal mass wherein the solar heat is stored at high to low temperatures, from which the heat pump withdraws heat at moderate temperatures of 55° to 90° F., and wherein residual heat at low temperatures is utilized for auxiliary purposes such as to pre-heat a domestic hot water supply or the like.

It is substantially total environmental assistance for one or more liquid or water source heat pumps with which the present invention is concerned, a comprehensive concept which involves the conservation of energy, both by collection of all available heat sources, including solar insolation, terrestrial re-radiation, auxiliary absorption, and assisted by heat absorption to or from and from within the system under whatever conditions. The more or less predictable collection of solar energy in a thermal mass is variable to say the least, and water source heat pumps have a practical operating range, at times below the temperature of said thermal mass storage of solar energy and at times above said thermal mass temperature, at whatever temperature variant said mass might be above or below the range of normal heat pump operation. That is, there will be times when the remaining solar energy stored in the thermal mass is less than said 55° F. minimum, and times when it is more than said 90° F. maximum. To this end, therefore, the thermal mass is stratified in accordance with my invention as it is disclosed and claimed in my U.S. Pat. No. 3,996,759 issued Dec. 14, 1976 entitled ENVIRONMENT ASSISTED HYDRONIC HEAT PUMP SYSTEM. To this end, convertible solar panels are employed and from which heat is collected and discharged, the collected heat being progressively absorbed into a thermal mass as the liquid transfer media moves toward the low heat range section, and to and from which heat is exchanged into and from the atmosphere when heat is in excess or deficient within the system, respectively.

The application and withdrawal of heat into and from the stratified thermal mass storage is by means of closed loop pumping circuits and through a mixing or proportioning valve to assist the heat pump, whereby the said water source to the heat exchanger is controlled within the 55° to 90° F. water source range as by means of a thermostat control over said valve. In accordance with the invention provision is made for extraordinary conditions, one to apply heat as by the application of external energy and the other to remove heat. Studies have shown that heat pumps consume far less purchased energy than other conventional heating, ventilating and air conditioning systems employed to heat and cool buildings. Significant improvements in performance and reliability in heat pumps have been made and with energy problems and the escalating costs of energy, present day heat pumps are more economical than ever before, and all of which is of increasing concern to utility planners now desperately attempting to maximize the use of power generation. Since heat pumps utilize more readily available and useable low temperature energy sources, further reductions in purchased energy consumption by heat pumps during normal heating periods is a general object of this invention.

The conventional reversible-cycle heat pump is similar to a refrigeration machine and has the same basic components, namely a compressor, condensor and evaporator. In the operation of a typical "air-to-air" heat pump, outside air has a useful heat content even at lower temperatures, resulting in free heat that makes it possible for the heat pump to supply more energy than it consumes; with a high heating coefficient of performance ($COP_H$), i.e., the ratio of useful heat output to electrical energy input apparently 2.0 which falls off rapidly at ambient air temperatures below 40° F. Consequently, the heat pump has the lowest operating cost of any present day electrical heating/cooling equipment, providing that a useful heating source is made available throughout a substantial portion of the operating hours. The same advantage is available with "water source" heat pumps with which this invention is preferably concerned. Therefore, it is an object of this invention to advantageously employ such heat sources as the underlying earth, the surrounding atmosphere, solar radiation, and auxiliaries such as space lighting etc. within the building to be conditioned. As a result, there is an unexpected increase in the $COP_H$ in the operation of said water source heat pump, for substantial energy saving during both the heating periods of the day and night.

Low temperature heat sources such as the earth and the surrounding atmosphere are useful energy sources when combined with a heat pump capable of utilizing the same to increase performance. It is preferred therefore to employ a water source heat pump that advantageously utilizes water heated to a low temperature by the ground temperature ambient of about 55° F., and water heated by the air ambient of about 55° to 80° F. as the case may be. It is an object therefore to provide means to acquire a water source at the ground ambient of about 55° F., in practice a heat exchange well sunk into the earth a substantial depth. It is another object therefore, to provide means to acquire auxiliary heat at temperatures of about 50° to 80° F. It is also an object therefore to provide water-to-air heat pump temperature transfer of 55° to 90° F., and to provide water-to-air radiation into the atmosphere as well as air-to-water re-radiation at prevailing temperatures as circumstances require. With the present invention, the heat pump unit has an auxiliary heat transfer intake coil ahead of the condensor when in the Heat Mode, and ahead of the evaporator when in the Cool Mode.

Solar assisted heat pumps conserve energy by combining the thermodynamic features of a heat pump with the relatively low temperatures (50° to 90° F.) readily available from flat plate solar collectors, it being an object of this invention to provide a balance between solar energy generation and its utilization. In practice, solar panels collect heat up to about 160° F., and it is therefore an object to proportion this heat source with chilled water for maintaining operational water in the range of 55° to 90° F. It is another object to provide storage for both heated and chilled water, the latter to be employed during the cooling cycle so as to assist and permit a reduction in power demand, for example to reduce summer demand peaks that are often experienced by electrical utilities. It is also an object to provide a modular solar panel installation which establishes an integral roof structure, and which is convertible for both heat absorption and heat rejection.

Air conditioning systems of the type under consideration are used for commercial as well as residence buildings, and very often produce waste heat when operating in the cool mode. Normally, this waste heat is discharged into the atmosphere by means of a cooling tower, an air cooled condensor or heat exchanger. In the case of solar assisted systems, for example, glazed panels are employed for the absorption of energy from the sun during the day, whereas unglazed panels are employed for re-radiation into the atmosphere during the night; and where such panels are employed for both absorption and re-radiation, unglazed panels are used as a compromise less efficient than those that are glazed. Since the function of a cooling tower is to discharge heat the same as the unglazed solar panel used for re-radiation, it is an object herein to provide means by which a solar panel is convertible from a glazed condition to an unglazed condition, so as to be as efficient as possible in either of the aforesaid conditions and functions thereof. In practice, glass louvers are employed to shift from a closed hot-house condition to an open ventilating condition, the glass louvers being cross sectioned as required, as for example as a lens form for the collection of direct light in the solar mode; flat glass being preferred for indirect lighting. It is to be understood that any combination of flat and/or lens shaped glass can be employed as circumstances require. As a result, the need for a conventional cooling tower is eliminated.

The environmental assisted heat pump presents the advantage of combining efficient heating and cooling capabilities into a single integrated unit, it being an object to practice an economical means of re-distributing captured energy from low temperature heat sources including solar heating. As a result, heat coefficient of performance ($COP_H$) in the Heating Mode is high, while cooling demands in the Cooling Mode are reduced through the assistance of applying chilled water ahead of the condensor and/or behind the evaporator, depending upon whether excess cooling capacity is extracted for storage or delivered from storage, as the case may be. Accordingly, it is an object of this invention to advantageously employ said performance efficiency by reducing the size or performance capacity (minimizing the same) of the heat pump unit, relying upon the assistance afforded by maximized heat energy conservation. As a result, there is a substantial savings realized within the operation of this integrated conditioning system, all as hereinafter described.

The installation of solar heat collectors has required field labor for the involved piping therefor, and which accounts for as much as half the cost; and to this end it is an object of this invention to modularize solar panels which are complementary to each other without additional piping and to consolidate substantially all pumps, valves and related plumbing within a Control Center. In carrying out this invention, the panels mate one with the other with the use of interconnecting nipples that are selectively employed in place of plugs that are removed as circumstances require, and all of the cooperatively related components are plumbed to a common Control Center.

DRAWINGS

The various objects and features of this invention will be fully understood from the following detailed description of the typical preferred forms and application thereof, throughout which description reference is made to the accompanying drawings, in which:

FIG. 2 illustrates the installation and service center therefor adapted to be connected to the heat pump unit and to the separate heat sources and hot and cold storage.

FIG. 3 is a detailed view of the louvered solar panel which characterizes this invention.

FIG. 4 is a sectional view taken as indicated by line 4—4 on FIG. 3.

FIGS. 5 and 6 are detailed views of the plug and nipple which characterizes the adaptation of the corner fittings shown in FIG. 7.

FIG. 8 is an enlarged detailed view taken as indicated by line 8—8 on FIG. 4, and FIG. 9 is a diagramatic view showing the arrangement of modular panels as they are interconnected by the nipples of FIG. 6 utilizing the plugs of FIG. 5.

PREFERRED EMBODIMENT

Figure 1:
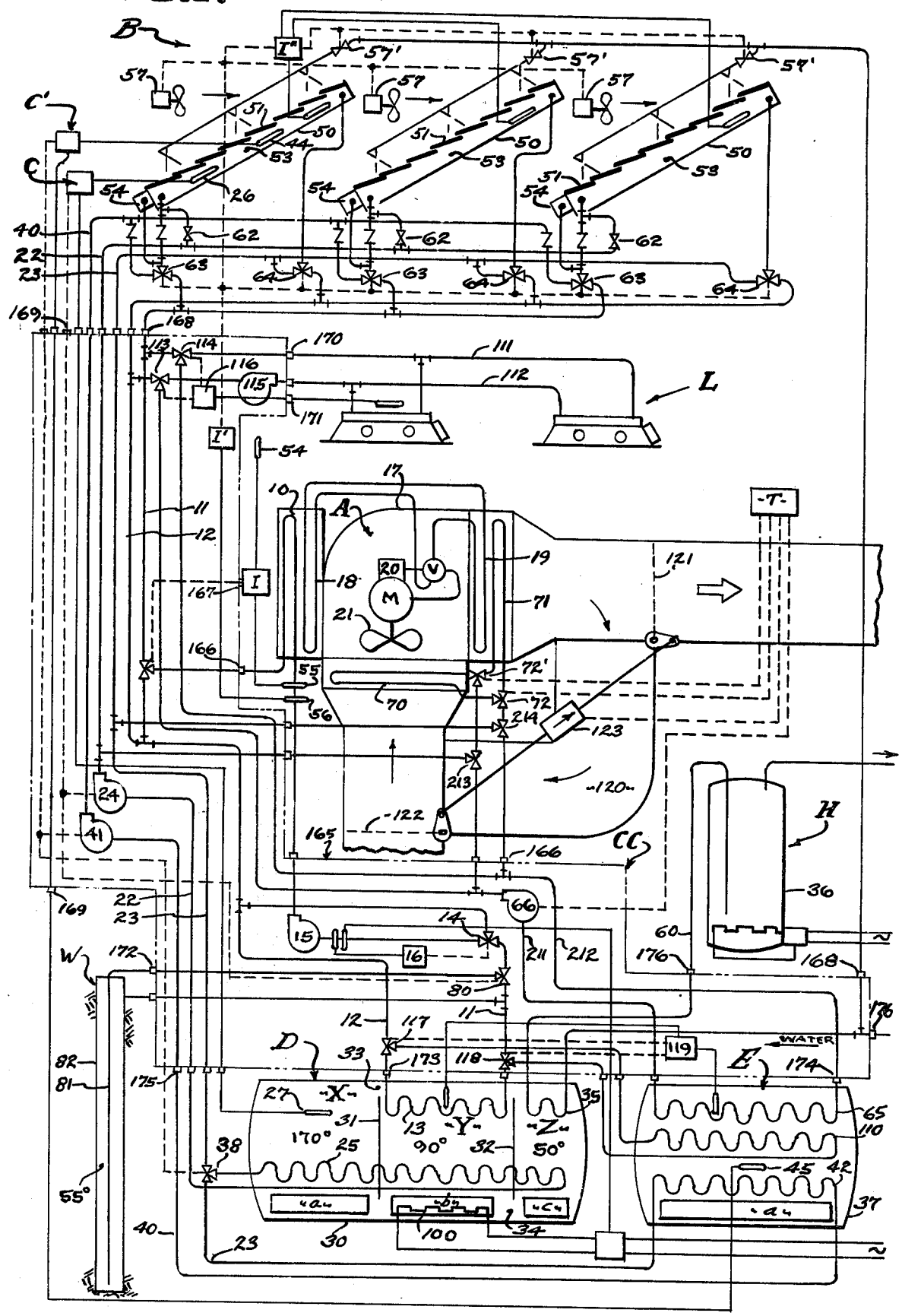
FIG. 1 is a schematic diagram of the energy source heat pump conditioning system of the present invention.

This invention relates to a hydronic heat pump A and air conditioning system operating in balance with the total environment. Water source heat pumps operate efficiently with a water source temperature range of, for example, 55° to 90° F. and it is this range within which the heat pump employed herein is operated, as follows:

During the Heating Mode, heat is absorbed by the refrigerant in the refrigerant to water coil operating as an evaporator at low temperature from the natural heat source, such as the ground or air or solar or auxiliary heated water. The refrigerant is then compressed, which creates a rise in temperature. Heat is then rejected in the refrigerant to air coil operating as a condensor at high temperature into the medium or space requiring heat. Since the amount of heat rejected, which is the useful energy output, is the work of compression (energy input) plus the heat absorbed in the evaporator, the useful output is always higher than the input work. The ratio of output to input, or coefficient of performance ($COP_H$), for an ideal cycle is defined mathematically as $T_2/(T_2-T_1)$ in which $T_1$ is the absolute temperature of the evaporator and $T_2$ is the absolute temperature of the condensor. Therefore, increasing the evaporator temperature increases the coefficient of performance.

Unfortunately, available natural heat sources such as outdoor air decrease in temperature as the need for space heating increases, and concurrently the required input per unit of output of the heat pump increases upon the decrease in evaporator temperature as a result of said lower heat source temperature. The net effect is a dual penalty: (1) lowered efficiency, and (2) less heating capacity; accompanied by a need for more heat.

Fortunately, sufficient direct or indirect sunlight is most often available, even when outdoor air temperatures are low, to be used so as to raise the evaporator temperature with advantages as follows: (1) low temperature heat absorption (50° to 90° F.) at the solar panel is feasible because of the low temperature requirements for efficient heat pump operation, namely the heat absorption temperatures at the evaporator in the Heating Mode. (2) the relatively low temperature requirements facilitates storage of heat following periods when the supply of solar energy exceeds the demand. (3) the solar collector area can be minimized because of low temperature requirements and/or less exotic constructions utilized therefor, inasmuch as solar heat absorption is readily attained in the range of 50° to 90° F. Accordingly, the subterranean ambient temperature of about 55° F., the solar absorption temperature range of 50° F. to 90° F. and up to 160° F. (approximate), and auxiliary heat such as lighting heat in the temperature range of 50° to 80° F., are all readily available for immediate use or for storage and subsequent use.

Heat exchange means B is employed, preferably in the form of a multiplicity of solar heat collectors, which in accordance with this invention are convertible heat exchange means alternately operable to collect heat energy into liquid and to discharge it therefrom. Differential control means C and C' are provided to circulate solar heat transfer media (water) when it is at a higher temperature than the thermal mass to be increased in temperature thereby, and conversely to circulate heat transfer media (water) containing excess heat to be exchanged into the atmosphere. A first stratified thermal mass D is provided in the form of a compartmented reservoir comprised of a high heat range section X, a moderate heat range section Y associated with the water source heat pump or heat pumps A, and a low heat range section Z associated with auxiliary needs such as to apply residual heat to pre-heating of domestic hot water. A second thermal mass E is provided in the form of a cold reservoir; and differential control means C is provided to circulate cooled water therethrough when it is at a lower temperature than the thermal mass to be decreased in temperature thereby. The solar heat collectors B are provided for applying and/or removing heat from the heat pump water source circuit, and a residual heat transfer means H is provided for pre-heating the domestic hot water supply. In association with each of the aforementioned means A through H there are heat transfer coils and the like in the various liquid or water circuits that transfer heat directed for optimum operation of the system governed by thermostatic and differential controls; and all of which are associated with the stratified thermal mass D as will be described.

The heat pump A employed herein is of the water source type that requires a supply of 55° to 90° F. liquid for its assistance, preferably water, to and from which heat is transferred by a refrigerant to source water heat exchanger coil 10 at the heat pump. The coil 10 is a closed loop water source circuit comprised of a delivery line 11 and a return line 12 extending from a heat exchanging coil 13 immersed in the moderate heat range section Y of the thermal mass D. The thermal mass temperature in section Y is, at most times, expected to be in excess of the maximum 90° F. of the water source, and to this end a proportioning valve 14 is provided in delivery line 11 through which the source water is circulated by means of a pump 15 on demand of the water source heat pump unit, said valve being controlled by a temperature responsive means 16 in said line. The heat pump A is comprised, generally, of a housing 17 in which reversely operable heat exchanger coils 18 and 19 operate as evaporator and condensor elements of a mechanical refrigeration system and which includes a compressor unit 20 with flow directive valve means V and expansion valve means (not shown) to condition the same for heating or cooling as may be required. That is, the flow directive means operates in the Cooling Mode by expanding refrigerant into the coil 19 as an evaporator in which case the refrigerant to water heat exchanger coil 18 acts as a condensor. Conversely, in the Heating Mode the evaporation takes place in the refrigerant to water heat exchanger coil 18 while condensing takes place in coil 19.

In accordance with the operation of such heat pumps, the coil 10 and coil 18 are combined in the refrigerant-to-source water heat exchanger that transfers heat at the heat pump unit in each mode of operation, in the former cooling mode to transfer heat into the water source loop return line 12, and in the latter heating mode to transfer heat into the refrigerant. A blower 21 circulates air through the coil 19 for heating and/or cooling the air conditioned zone serviced by the heat pump, it being understood that a plurality of heat pumps can draw water from the closed loop circuit. It is to be understood that the compressor unit 20 and the blower 21 are powdered conventionally as by electric motors, or supplemented with or replaced by a Rankine cycle prime mover utilizing, for example, the solar collectors with high temperature heat transfer media utilizing the collector shown in FIG. 3 with shaped elements 152 or the equivalent to energize a turbine drive for achieving a solar powered cooling effect at the heat pump.

The heat exchange means B is a convertible heat collecting and exchange panel that collects solar heat energy by insolation in a first heating mode, and that discharges excess heat energy in a second cooling mode. There is a closed loop heating circuit comprised of a delivery line 22 and a return line 23 extending from a heat exchanging coil 25 immersed coextensively throughout the high to low heat range sections X, Y, and Z. And, there is a closed loop cooling circuit comprised of a delivery line 40 and a return line 23 extending from a heat exchange coil 42 immersed in the cool tank E. The means B is primarily for the absorption of solar heat by means of insolation, and secondarily for the discharge of heat by means of exchange thereof into or from the atmosphere, as will later be described. The collector or collectors of means B are associated with the stratified thermal mass, the temperature in section X expected to be at a lower temperature than the collectors per se through which heat transfer liquid or water, preferably water-glycol solution, is circulated by a pump 24 through the lines 22 and 23, and by a pump 41 through line 40 and said return lines 23, the pumps being operated by said differential control means C and C' with temperature responsive means 26 and 27 at the means B and thermal mass D, and with temperature responsive means 44 and 45 at the means B respectively. The control means C is set so that the pump 24 is operated only when the collector temperature is greater than the thermal mass temperature within section X thereof, and the control means C' is set so that the pump 41 is operated only when there is a demand for cooling in the contents of tank E or excess heat is to be discharged by the heat exchange means B.

The stratified thermal mass D is provided so as to distribute graduated ranges of heat throughout the several sections X, Y, and Z, thereby separating higher temperature water from lower temperature water, according to the requirements of heat pump A. As shown, there are three sections in a liquid storage tank 30 having vertically disposed partitions 31 and 32 separating the tank into a high heat range section X, a moderate heat range section Y and a low heat range section Z. The tank 30 is horizontally disposed and filled with a liquid mass such as water, in which case the partitions are provided with upper and lower liquid or water transfer ports 33 and 34 for the convection flow or thermal syphon effect of heated and/or cooling waters from one compartmented section to the other. Thus, cooler waters from section Y will enter into section X through lower ports 34 while hotter waters discharge from section X into section Y through the upper ports 33; and independently, cooler water from section Z will enter into section Y through lower ports 34 while hotter waters discharge from section Y into section Z through the upper ports 33. In carrying out the present invention, and in practice the operational temperature range for section X is 70° to 190° F., for section Y is 70° to 120° F., and for section Z is 70° to 100° F; however a normal operational temperature range for section X could be 90° to 120° F., and for section Y could be 60° to 90° F., and with a temperature of less than 60° F. for section Z, it being understood that these temperature ranges will vary greatly dependent upon the availability of solar heat, make-up water for domestic use etc., and any use to which the system is to be put. Should there be insufficient heat captured by solar insolation and/or from ambient surroundings, an immersion electric heater 100, or any suitable available auxiliary heat source, is thermally conductive with the thermal mass (and mass b later described) so that if temperature falls below 55° at any time, heater 100 will be activated to maintain this temperature level.

Immersed in the low heat range section Z is a heat exchanging coil 35 comprising the residual heat transferring means H conducting domestic water from a public utility water supply or the like and to a domestic water storage heater 36. Alternately, the compartmented separation can be effected by a vertical disposition of the tank 30, with or without the partitions 31 and 32, and wherein the hottest liquid or water rises upwardly toward the top portion of the tank by means of the convection flow or thermal syphon effect. The coextensive heating coil 25 is complementary to the aforesaid heat range stratification, having its hottest portion within section X, its moderate heat portion within section Y, and its low heat portion within section Z, all of which advantageously employs the maximum temperature differential available within the thermal mass D. It will be apparent, therefore, that there is a high heat range, a moderate heat range and a low heat range portion of the thermal mass that is stored in the tank 30, and each associated with heat transfer coils 25, 13, and 35, respectively, that induce the aforesaid heat range differentiations by their induction, conduction and dissipation of heat. As is indicated, supplementary mass a, b, and c, is installed residually in each of said sections X, Y, and Z respectively, and each communicatively capable of holding heat according to the section in which they remain, such as solid insoluble material of selectively high heat retaining capabilities.

The second thermal mass E is provided to separate a lower temperature thermal mass according to the dissipation availability with respect to terrestrial re-radiation and the like. In other words, the thermal mass E is a cold reservoir from which heat energy is removed. Accordingly, the mass E advantageously utilizes the aforesaid heat exchange means B which is secondarily a dissipator of heat by means of radiation, since the outside air ambient is often much lower than the condensor and/or thermal mass temperature in the reservoir of means E. To these ends, the means E involves a liquid storage tank 37 filled with a liquid mass such as water, preferably the same water-glycol solution that is circulated through the collector B, to be stored at low temperatures below 70° F. A supplementary mass d is installed residually in the storage tank 37 and capable of holding heat therein.

The said water glycol solution is alternately drawn from thermal mass D or thermal mass E by means of the pumps 24 and 41 associated respectively with return line 23 that is tapped by diverting valve 38 which alternately direct the collector flow from return line 23 and through heat exchanging coils 25 and 42 respectively. The pump 41 is operable to circulate the low temperature water when required as controlled by a differential control means C with temperature responsive means 44 and 45 at the collector B and thermal mass E respectively. The control means C is set so that the pump 41 is operated thereby only when the collector temperature is lesser than the thermal mass temperature within the tank 37 up to some pre-determined minimum temperature to be maintained at all times in tank 37. A heat exchanging coil 65 is immersed in the tank 37 of thermal mass E, and through which liquid heat transfer media is circulated through a closed loop center source circuit comprised of a delivery line 211 and a return line 212 by a pump 66 on demand of the water source heat pump unit and responsive to the thermostat T controlling the same. Diverting valves 213 and 214 direct flow alternately through heat pump A or through the closed loop lines 22 and 23 for circulation through the heat exchange means B when circumstances require.

Referring now to the heat exchange means B, solar panels 50 are provided with means 51 converting the same from a glazed condition (see FIG. 1) to an unglazed ventilated condition (see FIG. 3), enclosed so as to apply the hot house effect or ventilated so as to exchange heat by the surface-to-air effect respectively. To this end the solar panel comprises a coil or plate-like shell 52, or the like, through which the water-glycol solution is circulated and an enclosable heat exchange chamber 53 through which solar insolation or heat exchange by conduction occurs. In practice, the coil or shell 52 comprises pairs of large diameter headers 52a and one at each side of the panel 50 and between which heat exchange tubes 52b extend in parallel relation, there being heat transfer fins 52c engaged over the tubes in common side by side relation, all within chamber 53. In its preferred form, the means 51 comprises light transmitting or transparent louvers such as glass which alternately close and open the chamber 53 alternately positioned by an actuator 54 responsive to fluid pressure as a result of flow from pump 41 through line 40 or from pump 15 through line 11. In practice, the glass louvers can be flat glass for a defuse or indirect mixed light condition; or they can be of lens form or cross section for direct light to concentrate the same; or any combination thereof. Accordingly, a spring bias or the like normally maintains an open or closed position of the louvers and preferably a closed position for solar heating, and subject to opening by the actuator 54 when ventilated heat exchange is required.

It is significant that heat absorption by means B is associated with the stratified heated mass D and the chilled mass E through the aforementioned delivery lines 22 and 40 that are tapped by diverting valves 62 and 63 to the panels 50, which alternately directs the flow from lines 22 and 40 through the panel 52 and into return line 23 as controlled by selector valves 64 and 38 associated with the heat source return line and coils 25 or 42 of masses D and E respectively. Accordingly, the diverting valves 62 and 63 control the circulation from pumps 24 and 41, while the selector valves 64 and 38 control the circulation from pump 15; the several modes of operation directing circulation through the solar panels 50 converted according to the pressure applied or withdrawn from the actuators 54. The pump 15 is operable to circulate the water as required, and the heat dissipation mode is put into effect turning on a fans 57 in response to a control I' (later described) and by sequentially opening spray or mist valves 57' in response to control means I'' with sensors in each panel 50 heat may be drawn from the outside air to the water source loop, for example when the water source temperature is near or below the minimum 55° F. and the outside air is of higher temperature the heat reclamation mode is put into efect by throttling flow through valve 63' (see FIG. 1), as sensed by the differential control means I with temperature responsive means 54' and 55 at the outside air and in the water source loop respectively. The cooling (absorption) or heat rejection mode is put into effect by opening valve 63 to coils 52 from line 40 or 11, for example, when the water source temperature is near or above the maximum 90° F., by a control means I' with temperature responsive means 56 in the water source loop. Operation of either the heating or cooling mode actuates the valves 64 in conjunction with valve 62 and 38 which diverts flow respectively from line 22 to coil 25 or to coil 42 to extend the water source loop through line 12 to be available through the solar panels 50, and simultaneously to energize the motors of an air circulating fans 57. The evaporative cooling and heat exchange absorption means B is, therefore, a two-way or dual purpose means that tempers the closed loop water source by extending the same for heating or cooling as circumstances require.

The heat pump A is assisted in both the heating mode and the cooling mode, as determined by a multi range thermostat T. The thermostat T is temperature responsive within a zone to be air conditioned and controls assistance from either the heat exchange means B or the cold thermal mass E, by directing hot and cold fluid selectively through heat exchanging coils 70 and 71 at the return inlet and useful air outlet, respectively, of the water source heat pump A. Valves 72 and 72' controlled by thermostat T determine flow through heat exchanging coils 70 or 71. In the heating mode, the valves 72 and 72' are open only through the heat exchanging coil 70, and in the cooling mode, the valves 72 and 72' are open only through the heat exchanging coil 71. In the event that the effect of load transfer on supply air delivered through coil 71 will not permit the pre-determined zone space temperature to be maintained with water source heat pump A operative, then said flow to coil 71 is shut off so that all of the available capacity of the water source heat pump A can be utilized for cooling of its respective zone. However, if the latter unassisted operation of the heat pump A remains insufficient, only then does the thermostat T operate the valve 72 to open and direct flow to heat exchanging coil 70 for lowering the temperature at the inlet of return air, at the point of greatest thermal differential. Thus, the water source heat pump A is automatically assisted by direct hot or cold sources, as circumstances require.

The residual heat temperature means H is associated with the stratified thermal mass D to absorb heat from the low heat range section Z thereof. It is the domestic water storage heater 36, or a like utility such as a pool heater, that is in a line 60 through coil 35, by which means water is pre-heated to a temperature available in the section Z.

In accordance with this invention the solar panels 50 of the heat exchange means B are convertible for the exchange of heat, whereby a cooling tower becomes unnecessary. In addition to this primary source of heat by solar insolation and cooling by heat exchange, heat is acquired from the ground by well means W and by auxiliary heat means such as lighting L. And, an additional source of cooling is available with the operation of the heat pump A, by means of recirculation of supply air thereby in the Cooling Mode.

Referring now to the well means W and its subterranean heat source at an ambient of about 55° F., a heat sink of concentric tubes 81 and 82 is installed in a bore into the earth at the building site to be conditioned, and through which the water-glycol solution is circulated from line 11 through a by-pass valve 80. When by-pass valve 80 is closed to the inner tube 81 of well W, flow continues through line 11 from coil 13. However, when by-pass valve 80 is open, flow is through the outer tube 82 of well W and from the inner tube 81 and returned into line 11. The subterranean ground heat is absorbed by the well exposure throughout its depth, thereby bringing the water-glycol solution to about 55° F., as controlled by the temperature responsive means 27 of control means C operating the by-pass valve 80.

Referring now to the lighting means L and its useful heat source therefrom in the range of 50° to 80° F., a fluid circuit therefrom into lines 11 and 12 comprises delivery and return lines 111 and 112 connected into lines 11 and 12 by selector valves 114 and 113 respectively. A multiplicity of lighting fixtures (lamps at 100° F.) discharges a substantial amount of heat energy when in operation, normally radiated therefrom as waste heat. However, recovery of this energy has been practiced by employing water cooled luminaires as components of hydronic systems utilizing the heat acquired therefrom; and with the additional advantage of lighting efficiency, since luminaires operating at lower temperatures produce more light for a given energy input. Such units are equipped with reflector housings having integral water passages as indicated, and with the circulation of liquid flowing therethrough, absorb heat radiated from the lamps and from the ballast. The water-glycol solution is circulated through lines 111 and 112 by a pump 115 under control of a temperature responsive means 116 at the lighting fixtures and which opens the selector valves into lines 11 and 12 therefrom when the temperature of the luminaire heat source is within the useful range.

The closed loop water source circuit through lines 11 and 12 can be extended to a heat exchanging coil 110 immersed in the chilled tank of thermal means E when the section Y of thermal means D is below the 50° to 90° F. range, and said means E within said range. In practice, a differential control is employed therefor, with a temperature responsive means 119 sensing temperature at said two masses and controlling selector valves 117 and 118 that direct the flow selectively between coil 13 and coil 110.

Referring now to the run-around condition of the heat pump A and by-pass of supply air in the Cooling Mode, the thermal mass E is to be chilled thereby when supply air from the heat pump is required for conditioning. That is, the heat pump operating in the Cooling Mode with the coil 18 acting as a condensor and the coil 19 acting as an evaporator, produces cooled air which is collected by coil 71 and circulated through coil 65 to chill the thermal mass E. Accordingly, the supply air is by passed immediately as return air through a duct 120 provided with moveable baffles 121 and 122 positioned by an actuator 123 responsive to the mode as controlled by thermostat means T. As shown, the circulating pump 66 transfers fluid for continued heat transfer out of thermal mass E to be absorbed by the heat pump A.

The panels 50 of heat exchange means B are modular and adapted to interengage one with the other, in side by side corner-to-corner relation, with fluid connections established between the headers 52a thereof, either in a series and/or parallel relation with respect to flow through the said panels. In practice, the chamber 53 is established by channel-shaped side members 150 arranged in rectangular formation joined at four corners and enclosed by a bottom 151 and by the louvered top 51. In accordance with the invention, the louvers are glass slats 152 hinged to extend transversely of the module with end mounting brackets 153 pivoted to opposite side members 150, there being an actuator rod 154 extending between the brackets and to an actuating lever 155 to be operated by the actuator 54 (see FIG. 3). As shown, a spring 156 returns the actuating lever, rod and brackets to a position closing the chamber by means of shutter action, a transparent enclosure.

The coil, solar collector plate or shell, is preferably as above described and comprised of the headers 52a with the finned heat exchange tubes 52b extending therebetween. As shown in FIG. 8 the fins 52c snap over the tubes 52b and are disposed in spaced relation coextensive of the panel area, as shown. As best illustrated in FIG. 4, the opposite end of each header 52a is closed by a corner fitting 160 mounting the tube assembly into the frame of side members 150, said fittings being in open fluid communication with the header tubes 52a and open at the exterior of the two right angularly related sides of the panel corner, at each corner of the panel 50. In practice, the exterior openings are threaded and sealed with O-rings to receive a closure plug P as shown in FIG. 5, or to receive a fluid transmission nipple N as shown in FIG. 6, whereby fluid transmission through the headers 52a is selective. Accordingly, the plugs P can be retained or replaced with nipples N, as clearly detailed in FIG. 7; and as shown in FIG. 9 the selection of header flow can be as circumstances require, for example the series flow through a multiplicity of panels arranged in parallel. It is to be understood that an infinite number of interconnection arrangements can be attained with the selection of plugs P and/or nipples N applied to the corner fittings 160, as indicated.

Referring now to the installation of this Multi Source Heat Pump Air Conditioning System in a building as shown in FIG. 2, I provide a control center CC which comprises all of the piping and working components necessary to operation of the system so as to support the heat pump A and to acquire the functional advantages of the heat exchange (panels) means B, lighting means L, well W and thermal masses D and E and including the domestic water supply means H (see control center CC as it is enclosed within the phantom lines in FIG. 1). As shown in FIG. 2, the control center CC is an enclosure or housing 165 into which the flow lines, sensor lines and control lines are connected; the heat pump A being connected thereto through lines 11 (from coil 10 and pump 15), through valves 72 and 72' to coils 70 and 71 by connectors 166, and the sensor control by connector 167; the panels of means B being connected thereto through lines 11, 12, 22, 23 and 40 by connectors 168, and the sensor and control lines by connectors 169; the lighting means L being connected thereto through lines 111 and 112 by connectors 170, and the sensor by connector 171; the well W being connected thereto through lines 81 and 82 by connectors 172; the thermal means D and E being connected thereto by connectors 173 and 174 respectively and the control line by connector 175; the water supply means H being connected thereto through the inlet line and outlet line 60 by connector 176 and the power lines by connectors (not shown). From the foregoing, it will be seen that the complex of the system can be pre-fabricated as a unit and supplied to the installer with simple instruction concerning the connections to be made directly to the components involved.

There are four basic modes of operation attributed to the hereinabove described air conditioning system, as follows:

(1) Day Cooling—Night Cooling; wherein the heat pump A operates in the cooling mode with excess cooling capacity transferred by coil 71 to the chill tank 37, for example when the closed loop heat source heat sink water temperature exceeds 90° F. The panel 50 of heat exchange means B are sequentially converted to their condition adapted to reject heat, while the lighting means L is cooled by the chilled heat sink water of thermal mass E, as required. The convertible panels are conditioned to reject heat during the day by means of ventilation and evaporation and/or at night by nocternal radiation.

(2) Day Cooling—Night Heating; wherein the heat pump A operates in the heating mode at night, drawing heat from the heat sink of thermal mass D, from the ground well W and also from the heat sink of thermal mass E. The purpose is to use the available heat and pre-charge the heat sink of thermal mass E for the next succeeding day.

(3) Day Heating—Night Heating: wherein the heat pump A operates in the heating mode, the panels 50 of heat exchange means B operating as solar heat collectors during the day and as radiators during the night, while extracting available heat from the lighting means L and from the heat sink of thermal mass D.

(4) Cold Storage: wherein air circulation of the heat pump A is by-passed for run-around operation in the cooling mode when the heat sink of thermal mass E is above a pre-determined temperature when there is no demand for heating or cooling.

Having described only typical preferred forms and applications of my invention, I do not wish to be limited or restricted to the specific details herein set forth, but wish to reserve to myself any modifications or variations that may appear to those skilled in the art:

I claim:

1. A multi source environmentally assisted air conditioning system wherein at least one water source mechanical refrigeration heat pump is operable to condition and to discharge return air from and into a zone to be air conditioned, and including; a convertible heat exchange means alternately operable for the collection of solar heat into a first liquid heat transfer media and for the radiation of internal heat from a second liquid heat transfer media, a thermal mass of high heat range and a thermal mass of low heat range, there being pump means circulating the liquid heat transfer media separately from the thermal mass of high heat range and from the thermal mass of low heat range respectively, and valve means for selective closed loop circulation of said liquid heat transfer media through the convertible heat exchange means and through either the thermal mass of high heat range or the thermal mass of low heat range, and there being water source pump means circulating the liquid heat transfer media separately for said closed loop circulation from the thermal mass of high heat range and from the thermal mass of low heat range and through heat exchanging means of the said water source mechanical refrigeration heat pump.

2. The multi source environmentally assisted air conditioning system as set forth in claim 1, wherein the convertible heat exchange means comprises louvered glazing closed by actuator means responsive to the flow of liquid heat transfer media for solar heat collection and opened by said actuator means for heat radiation.

3. The multi source environmentally assisted air conditioning system as set forth in claim 1, wherein the convertible heat exchange means comprises louvered glazing and actuator means therefor responsive to the flow of liquid heat transfer media through the thermal mass of high heat range to close for solar heat collection and alternately to open for heat radiation respectively.

4. The multi source environmentally assisted air conditioning system as set forth in claim 1, wherein the convertible heat exchange means comprises louvered glazing normally closed for solar heat collection and actuator means therefor responsive to the flow of liquid heat transfer media for rejection of heat pump condensor load to open the same for heat radiation.

5. The multi source environmentally assisted air conditioning system as set forth in claim 1, wherein the closed loop circulation of liquid heat transfer media comprises separate delivery lines to the convertible heat transfer means and a common return line to valve means selectively directing flow through the thermal mass of high heat range and the thermal mass of low heat range.

6. The multi source environmentally assisted air conditioning system as set forth in claim 1, wherein the said valve means includes closed loop circulation means from the water source pump means and thermal mass of low heat range and through the convertible heat exchange means.

7. The multi source environmentally assisted air conditioning system as set forth in claim 1, wherein the convertible heat exchange means comprises a multiplicity of panels with louvered glazing and actuator means therefor responsive to the flow of liquid heat transfer media to close and open the same for solar heat collection and for heat radiation respectively, and air circulating means to ventilate said panels when operating in the heat radiation mode.

8. The multi source environmentally assisted air conditioning system as set forth in claim 1, wherein the convertible heat exchange means comprises a multiplicity of panels with louvered glazing and actuator means therefor responsive to the flow of liquid heat transfer media to close and open the same for solar heat collection and for heat radiation respectively, and air circulating means with temperature responsive means for sequentially ventilating by addition one panel and another when operating in the heat radiation mode.

9. The multi source environmentally assisted air conditioning system as set forth in claim 1, wherein the convertible heat exchange means comprises a multiplicity of panels with louvered glazing and actuator means therefor responsive to the flow of liquid heat transfer media to close and open the same for solar heat collection and for heat radiation respectively, and moisture applicating means for evaporation within said panels when operating in the heat radiation mode.

10. The multi source environmentally assisted air conditioning system as set forth in claim 1, wherein the convertible heat exchange means comprises a multiplicity of panels with louvered glazing and actuator means therefor responsive to the flow of liquid heat transfer media to close and open the same for solar heat collection and for heat radiation respectively, and moisture applicating means with temperature responsive means for sequential application of evaporation within and by addition of one panel and another when operating in the heat radiation mode.

11. A multi source environmentally assisted air conditioning system wherein at least one water source mechanical refrigeration heat pump is operable to condition and to discharge return air from and into a zone to be air conditioned, and including; a heat exchange means for the collection of solar heat into a liquid heat transfer media and storage in a thermal mass, there being pump means for closed loop circulation of said liquid heat transfer media through the heat exchange means and through the thermal mass, a liquid circulating well for the collection of the ambient earth heat into a closed loop water source liquid heat transfer media, a valve means diverting the said closed loop circulation of the water source liquid heat transfer media from the thermal mass to the liquid circulating well, and there being water source pump means circulating said liquid heat transfer media from the thermal mass and through heat exchanging means of the said water source mechanical refrigeration heat pump.

12. The multi source environmentally assisted air conditioning system as set forth in claim 11, wherein valve means diverts the said closed loop circulation of the water source liquid heat transfer media from the thermal mass to the liquid circulating well.

13. The multi source environmentally assisted air conditioning system as set forth in claim 11, wherein control means responsive to a pre-determined temperature of said thermal mass operates said valve means to divert the said closed loop circulation of the water source liquid heat transfer media from the thermal mass to the liquid circulating well.

14. A multi source environmentally assisted air conditioning system wherein at least one water source mechanical refrigeration heat pump is operable to condition and to discharge return air from and into a zone to be air conditioned, and including; a heat exchange means for the collection of solar heat into a first liquid heat transfer media and for the radiation of internal heat from a second liquid heat transfer media, a thermal mass of high heat range and a thermal mass of low heat range, there being pump means circulating the liquid heat transfer media separately from the thermal mass of high heat range and from the thermal mass of low heat range respectively, and valve means for selective closed loop circulation of said liquid heat transfer media through the heat exchange means and through either the thermal mass of high heat range or the thermal mass of low heat range, a liquid circulating means for collecting the heat from lighting fixtures and into a closed loop water source liquid heat transfer media, and there being water source pump means circulating liquid heat transfer media separately for said closed loop circulation from the thermal mass of high heat range and from the thermal mass of low heat range and through heat exchanging means of the said water source mechanical refrigeration heat pump.

15. The multi source environmentally assisted air conditioning system as set forth in claim 14, wherein valve means diverts the circulation of the water source liquid heat transfer media into the closed loop thereof from the thermal mass of low heat.

16. The multi source environmentally assisted air conditioning system as set forth in claim 14, wherein control means responsive to a pre-determined temperature of said lighting fixtures operates the valve means diverting circulation of the water source liquid heat transfer media into the closed loop thereof from the thermal mass of low heat.

17. A multi source environmentally assisted air conditioning system wherein at least one water source mechanical refrigeration heat pump is operable in a cooling mode to condition and to discharge return air from and into a zone to be air conditioned, and including; heat exchange means for the collection of solar heat into a first liquid heat transfer media and for the radiation of internal heat from a second liquid heat transfer media, a thermal mass of high heat range and a thermal mass of low heat range, there being pump means circulating the liquid heat transfer media separately from the thermal mass of high heat range and from the thermal mass of low heat range respectively, and valve means for selective closed loop circulation of said liquid heat transfer media through the heat exchange means and through either the thermal mass of high heat range or the thermal mass of low heat range, a recirculation duct with damper means confining the conditioned discharge air of the heat pump to run-around to the intake thereof, and there being water source pump means circulating liquid heat transfer media from the thermal mass of low heat range and through heat exchanging means of the said water source mechanical refrigeration heat pump to absorb heat and thereby chill said mass.

18. A multi source environmentally assisted air conditioning system wherein at least one water source mechanical refrigeration heat pump is operable to condition and to discharge return air from and into a zone to be air conditioned, and including; heat exchange means for the collection of solar heat into a first liquid heat transfer media and for the radiation of internal heat from a second liquid heat transfer media, a thermal mass of high heat range and a thermal mass of low heat range, there being pump means circulating the liquid heat transfer media separately from the thermal mass of high heat range and from the thermal mass of low heat range respectively, and valve means for selective closed loop circulation of said liquid heat transfer media through the heat exchange means and through either the thermal mass of high heat range or the thermal mass of low heat range, a heat transfer loop of a water source liquid from the thermal mass of low heat range to the closed loop of the thermal mass of high heat range, and there being water source pump means circulating liquid heat transfer media separately from the thermal mass of high heat range and from the thermal mass of low heat range and through heat exchanging means of the said water source mechanical refrigeration heat pump.

19. The multi source environmentally assisted air conditioning system as set forth in claim 18, wherein valve means diverts the said closed loop circulation of water source liquid from the thermal mass of high heat range into the thermal mass of low heat range.

20. The multi source environmentally assisted air conditioning system as set forth in claim 18, wherein control means responsive to differential temperature between the thermal masses of high and low heat range operates a valve means diverting the said closed loop circulation of water source liquid from the thermal mass of high heat range into the thermal mass of low heat range.

* * * * *